(12) United States Patent
Chalfant, III et al.

(10) Patent No.: US 7,224,508 B2
(45) Date of Patent: May 29, 2007

(54) MEMS-BASED OPTICAL COMMUNICATIONS BEAM STEERING APPARATUS

(75) Inventors: Chuck H. Chalfant, III, Fayetteville, AR (US); Fred J. Orlando, West Melbourne, FL (US); Jeffrey T. Gregory, Mountainburg, AR (US); Chad B. O'Neal, Ruston, LA (US)

(73) Assignee: Space Photonics, Inc., Fayetteville, AR (US)

( * ) Notice: Subject to any disclaimer, the term of this patent is extended or adjusted under 35 U.S.C. 154(b) by 0 days.

(21) Appl. No.: 11/224,473

(22) Filed: Sep. 12, 2005

(65) Prior Publication Data

US 2006/0181761 A1    Aug. 17, 2006

Related U.S. Application Data

(60) Provisional application No. 60/609,420, filed on Sep. 13, 2004, provisional application No. 60/609,413, filed on Sep. 13, 2004.

(51) Int. Cl.
G02B 26/00    (2006.01)

(52) U.S. Cl. .................. 359/290; 359/291; 385/52

(58) Field of Classification Search .............. 359/290, 359/291; 385/52, 137, 134; 33/645, 568
See application file for complete search history.

(56) References Cited

U.S. PATENT DOCUMENTS 5,218,467 A    6/1993    Ross et al.

| 6,285,481 | B1 | 9/2001 | Palmer |
| 6,327,063 | B1 | 12/2001 | Rockwell |
| 6,347,001 | B1 | 2/2002 | Arnold et al. |
| 6,556,324 | B1 | 4/2003 | Meier |
| 6,577,421 | B1 | 6/2003 | Cheng et al. |
| 6,628,882 | B2 * | 9/2003 | Vaganov et al. ............ 385/140 |
| 6,731,878 | B1 | 5/2004 | Britz et al. |
| 6,806,882 | B2 * | 10/2004 | Kanda ........................ 345/532 |
| 6,806,992 | B2 * | 10/2004 | Soneda et al. .............. 359/291 |
| 6,935,042 | B2 * | 8/2005 | Bonham et al. .............. 33/645 |
| 2002/0102059 | A1 * | 8/2002 | Cho et al. ..................... 385/49 |
| 2003/0202236 | A1 | 10/2003 | Khoshnevisan et al. |
| 2005/0253055 | A1 * | 11/2005 | Sprague et al. ............ 250/234 |

FOREIGN PATENT DOCUMENTS

| EP | 0482472 A2 | 10/1991 |
| EP | 0482472 B1 | 10/1991 |
| EP | 0504022 A1 | 3/1992 |

OTHER PUBLICATIONS

U.S. Appl. No. 11/224,628, filed Sep. 12, 2005, Beam Steering for Optical Target Identification and Tracking without Gimbals or Scanning Mirrors.
U.S. Appl. No. 11/224,745, filed Sep. 12, 2005, Apparatus and method for Free Space Optical Communications Beam Steering without Gimbals.

* cited by examiner

*Primary Examiner*—Timothy Thompson
(74) *Attorney, Agent, or Firm*—J. Charles Dougherty

(57) ABSTRACT

A MEMS-based optical steering apparatus for free space optical transmitters, receivers, and transceivers is disclosed. The MEMS device comprises actuators linked to an optic fiber, the actuators operable to maneuver the optical fiber in the X-Y plane at the focal point of the transmitter, receiver, or transceiver. The MEMS device may thus be used to replace gimbals for beam steering applications.

20 Claims, 4 Drawing Sheets

MEMS-BASED OPTICAL COMMUNICATIONS BEAM STEERING APPARATUS

CROSS-REFERENCE TO RELATED APPLICATIONS

This application claims the benefit of U.S. provisional patent application No. 60/609,420, entitled "MEMS-Based Optical Communications Beam Steering Apparatus" and filed on Sep. 13, 2004, and U.S. provisional patent application No. 60/609,413, entitled "Apparatus and Method for Free Space Optical Communications Beam Steering without Gimbals" and also filed on Sep. 13, 2004. The entire disclosures of these applications are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract no. F29601-02-C-0021 awarded by the United States Air Force Research Laboratory.

BACKGROUND OF THE INVENTION

The present invention relates to the field of optical communications, and in particular to the field of beam steering for free space optical transceivers. More particularly, the present invention relates to a micro-electrical-mechanical systems (MEMS) apparatus for operation of the pointing and tracking system of an optical transceiver that does not utilize external gimbals.

Laser communications systems are today employed in a vast array of applications, including without limitation communication with aircraft and satellites from ground positions. A laser communication system generally consists of a transmitting terminal and a receiving terminal. A transmitting terminal typically receives an electrical signal from a signal source, and converts the electrical signal into an optical signal. The transmitting terminal then transmits the resulting optical signal using a transmitting telescope. The receiving terminal receives the optical signal through a receiving telescope, which focuses the optical signal into an optical photodetector, and then converts the optical signal back into an electrical signal.

In order for a receiving terminal to receive an optical signal from a transmitting terminal, the terminal telescopes must be properly aligned. This alignment process is known as beam steering. Generally, beam steering may be defined as changing the direction of the main lobe of a radiation pattern. In optical systems, beam steering is the manipulation of a transmitting telescope or receiving telescope, or both, to point in a desired direction. Other applications for beam steering, in addition to optical communications, include laser illumination, laser designation, laser radar, pointing and tracking, and remote optical sensing.

Beam steering in optical systems may be accomplished by changing the refractive index of the medium through which the beam is transmitted, or by the use of mirrors or lenses. In particular, some existing non-gimballed beam-steering solutions include acousto-optics, liquid crystals, electro-optics, micro-optics, galvanometer or magnetic mirrors, and micro-mirror arrays. These types of systems, however, have generally proven to be unwieldy, or lack the speed, precision, and reliability necessary for high-speed, long-distance free-space optical communications. Thus the most common means for beam steering in optical communications systems is by the use of a motorized gimballing system. A gimbal is a mechanical apparatus to allow a suspended object to rotate freely along two simultaneous axes, within a defined angle of view. Gimbals are well known in the art, having been used, for example, since at least as early as the sixteenth century in the suspension of maritime compasses. A gimballing system used for the alignment of an optical transmitter or receiver typically moves the entire transmitting or receiving telescope through the required field of view. Often, the transmitter and receiver telescopes are mechanically coupled so that the transmitted beam is in the exact direction of an incoming optical beam for collection by the receiving telescope, the two telescopes thereby operating with a common gimballing system.

Accurate alignment of the transceiver system is essential for free space laser communications systems. Therefore, gimballing systems must provide accurate alignment angular resolution in order for the receiver telescope to efficiently collect the incoming optical beam. Conversely, the transmitter telescope must be able to accurately point its beam so that a remote-receiving terminal can efficiently collect the optical signal for the photodetector. Mechanical gimballing systems have been favored in many free-space optical communications systems because they can provide very fast alignment times coupled with high angular resolution.

Gimballed beam-steering systems do, however, suffer from several important disadvantages. Such systems are quite heavy due to the weight of the mechanical components, motors, and servos necessary for such a system. While weight may not be as important a factor in the design of a land-based system, weight is of paramount importance in aircraft and, especially, satellite design. Gimballing systems are also quite bulky due to the required mechanical components, which is also a significant disadvantage in the design of airborne and spaceborne systems. Finally, mechanical gimballing systems require the use of a great deal of electrical power, far more power than is typically consumed by the electronics associated with an optical receiver or transmitter system. Again, while power consumption may not be as important a factor in permanent ground-based systems, it is a critically important factor in airborne and spaceborne systems, as well as in mobile ground-based systems such as may be mounted on land vehicles.

MEMS technology is today used to develop mechanical and electromechanical systems on a microscopic scale. MEMS devices are constructed using fabrication processes that are similar to those used for the construction of integrated electrical/electronic circuits (ICs). Such processes include ultraviolet lithography, thin film material deposition, and selective etching. Each of these processes are known in the art for the construction of both ICs and MEMS devices. MEMS devices have been used in a variety of applications, such as miniaturized macroscopic elements including mirrors, pressure sensors, accelerometers, and strain gauges. MEMS devices have been incorporated into a number of existing technologies in widely various fields, including microfluidics, ink jet printing heads, and drug delivery patches. MEMS offer many of the same advantages that ICs offer over macroscopic electronic components, including greatly reduced weight and bulk, lower power consumption, and economies of scale that allow them to be mass produced economically.

What is desired then is a device for beam pointing and tracking in an optical communications system that provides high speed and high angular resolution, with reduced size, weight, and power consumption as compared to traditional gimballing systems now employed in laser communications terminals. In particular, the inventors recognized that it would be desirable to develop a MEMS-based device for this purpose in order to take advantage of the very small size, weight, and power requirements of MEMS-based devices.

BRIEF SUMMARY OF THE INVENTION

The present invention is directed to a MEMS-based device to provide angular adjustment to an optical fiber situated in the focal plane of an optical beam pointing and tracking system. The MEMS device employs surface micromachined actuators to move an optical fiber through the optical plane of an optical signal receiver or transmitter. The fiber is fed through a bore in the MEMS device, which allows the actuators to manipulate the optical fiber in the X-Y plane of the receiver or transmitter. In the case of a receiver, this movement allows for signal tracking in order that the maximum signal strength may be received. In the case of a transmitter, this allows the signal to be pointed in precisely the desired direction. The MEMS device may be manipulated by various electrical signals that drive the actuators. A yoke may be employed to link the actuators with the optical fiber. By moving the optical fiber within the focal plane of a receiver or transmitter, signals may be received or sent, respectively, along a precisely defined direction.

By use of this MEMS-based device for beam steering, no gimbals are required in the pointing and tracking system, thereby greatly reducing the size, weight, and power consumption of the pointing and tracking system. In addition, the MEMS-device may improve performance by providing faster response times to a signal to change the direction of a receiver or transmitter. The result is a laser communications system that is more practical for low-cost, high-bandwidth application markets. Such a system is also capable of providing the high performance necessary for mission-critical applications such as military avionics and space-based inter-satellite communications, without decreasing reliability or functionality. In fact, reliability may improve over the complex mechanical systems required when gimbals are employed, since MEMS devices are typically more reliable than such systems.

It is therefore an object of the present invention to provide for a MEMS-based device for optical beam steering that achieves high speed and angular precision without the use of gimbals.

It is a further object of the present invention to provide for a MEMS-based device for optical beam steering that consumes relatively little electrical power during operation.

It is also an object of the present invention to provide for a MEMS-based device for optical beam steering that is of a relatively small size and weight.

It is also an object of the present invention to provide for a MEMS-based device for optical beam steering that has a relatively low production cost.

It is also an object of the present invention to provide for a MEMS-based device for optical beam steering that has a decreased response time to a re-directed signal, thereby allowing faster acquisition and tracking of a signal source.

It is also an object of the present invention to provide for a MEMS-based device for optical beam steering that utilizes a MEMS device fabricated according to traditional IC/MEMS processing steps and equipment.

These and other features, objects and advantages of the present invention will become better understood from a consideration of the following detailed description of the preferred embodiments and appended claims, in conjunction with the drawings as described following:

DETAILED DESCRIPTION OF THE INVENTION

Figure 1:
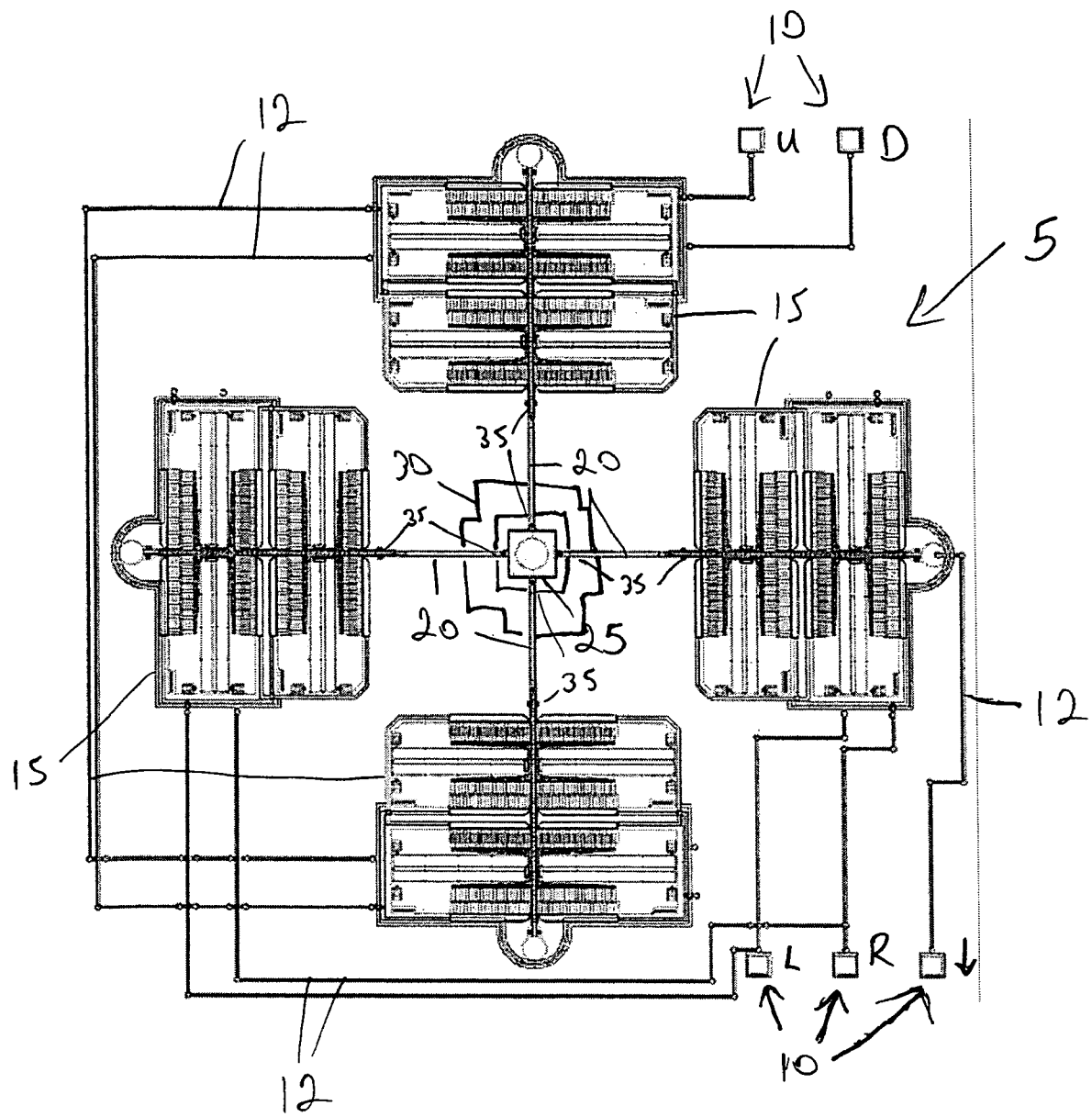
FIG. 1 is a schematic diagram showing the layout of a MEMS-based device according to a preferred embodiment of the present invention

With reference to FIG. 1, the preferred embodiment of the present invention may be described. MEMS device 5 is constructed using IC/MEMS fabrication techniques, preferably successive selective deposition and etching using ultraviolet (UV) photolithography on a single crystal silicon wafer. Electrical signals propagated into device 5 enter through one of bond pads 10. Each bond pad 10 is connected by wirebonding to electrical conductive paths 12. Bond pads 10 and conductive paths 12 may be constructed of metal, highly doped polysilicon, or other conductive materials. Conductive paths 12 are, in turn, electrically connected to electrostatic comb-drive actuators 15. As a result of this arrangement, a signal voltage applied at a bond pad 10 is propagated to one or more electrostatic comb-drive actuators 15.

In the preferred embodiment, device 5 comprises four electrostatic comb-drive actuators 15. Comb-drive actuators operate on the principle of electrostatic repulsion between two "combs" having interleaved fingers, with one comb being free to move. Imparting charge to such a device causes the free-moving comb to move away from the fixed comb, the effect achieved being that of a microscale linear actuator. MEMS manufacturing facilities can construct such devices, such as the facilities maintained at Sandia National Laboratories in Sandia, N. Mex. Such devices are used for a wide variety of applications in the optical communications field, such as in connection with switching elements in optical networks. As will be seen in FIG. 1, actuators 15 of the preferred embodiment each embody multiple sets of combs in order to achieve the depth of linear movement desired for this application.

Actuators 15 drive arms 20, which are pivotally linked to both a corresponding actuator 15 and fiber yoke 25. Arms 20 move about on top of ground plane substrate 30, which is preferably constructed of polysilicon. Arms 20 have pin or flex joints 35 at each end to allow yoke 25 to move freely in the X-Y plane above ground plane substrate 30, including movement at non-orthogonal angles.

Electrical drive signals reach each of actuators 15 through the corresponding bond pads 10 and the corresponding conducting paths 12. Four different types of signals are employed in the preferred embodiment: up, down, left, and right. These signals are labeled "U," "D," "L," "R," respectively, in FIG. 1. A ground signal is also required, which is labeled as a down arrow in FIG. 1. (Note that while only a single ground signal is illustrated in FIG. 1 for clarity, the preferred embodiment would include a ground line connected to each of actuators 15.) Each of the "U," "D," "L," and "R" signals may preferably be coded as a voltage applied at the corresponding bond pad 10.

A "U" signal causes the activation of the appropriate actuator 15 such that the arm 20 oriented in the Y-direction moves in the positive Y-direction, that is, in an upward direction, thereby causing yoke 25 to deflect upward. A "D" signal causes the activation of that same actuator 15 as activated by the "U" signal, but in this case the corresponding arm 20 moves in the negative Y-direction, that is, in a downward direction, thereby causing yoke 25 to deflect downward. An "L" signal causes the activation of each of the appropriate actuators 15 such that the arms 20 that are oriented in the X-direction move in the negative X-direction, that is, to the left, thereby causing yoke 25 to deflect to the left. It may be noted that this movement requires the leftward arm 20 to retract while the rightward arm 20 extends. Conversely, a "R" signal causes the activation of each of these actuators 15 such that the arms 20 that are oriented in the X-direction move in the positive X-direction, that is, to the right, thereby causing yoke 25 to deflect to the right. It may be noted that this movement requires the leftward arm 20 to extend while the rightward arm 20 retracts.

It may be seen from FIG. 1 and the above description that yoke 25 may be moved about on substrate 30 to any X-Y position within its range of motion by a combination of U, D, L, and R signals. For example, a simultaneous "U" and "R" signal will cause yoke 25 to deflect to the upper-right portion of substrate 30. In this way, yoke 25 may be moved to any desired position by the proper combination of signals, just as may be performed with gimballed steering and pointing systems.

In the preferred embodiment, both the Y-axis and X-axis actuation is provided by a pair of actuators 15 oriented to move linearly in the Y and X directions, respectively. In alternative embodiments, a different number of actuators 15 may be employed in either direction. For example, in one alternative embodiment the Y-axis actuation is provided by a single actuator 15 oriented to move linearly in the Y direction. A single actuator 15 was chosen for the Y direction in this alternative embodiment due to space requirements in the initial fabrication process. The X-direction movement in this alternative embodiment is provided by two actuators 15, despite the fact that only one actuator 15 is employed for movement in the Y-direction. In still another alternative embodiment, only one actuator 15 may be employed in each of the Y and X directions.

In the preferred embodiment, each actuator 15 providing drive in the same linear direction is controlled together such that only a single set of "U," "D," "L," and "R" drive signal inputs pads 10 is required. For example, only a single "L" signal is required in this arrangement to operate both actuators 15 that provide movement in the negative X-direction. Alternatively, separate pads 10 and conducting paths 12 could be provided for the drive signals directed to each actuator. In still another embodiment, both combined drive signals and a separate drive signal line to each actuator 15 could be implemented in the same device, providing application flexibility to the designer seeking to integrate device 5 into a desired mechanism.

The MEMS device 5 of FIG. 1 is preferably fabricated as five layers of polycrystalline silicon (polysilicon) deposited to form the structural layers of the preferred embodiment, with silicon dioxide (oxide) used as the sacrificial material that is fully removed by etching as a final process step, thereby creating the gaps and spacing needed for moving elements to operate. One of these layers is preferably reserved for use as a ground plane to dissipate charge accumulation under moving structures under high potential. Each layer of polysilicon and oxide is preferably deposited as a continuous thin film of material on the wafer, and then a UV-sensitive polymer photoresist is used to create a stencil through which the selected material was removed by etching. Each layer is patterned by one or more optical masks that may be preferably created from CAD artwork and are superimposed upon one other to generate the final working device 5.

It may be noted that while MEMS features are generally only a few microns along a minimum dimension, they may have very large aspect ratios, with, for example, lengths that exceed their height or width by a factor of 500 or more. Although traditional IC fabrication processes such as the UV photolithography of the preferred embodiment are used in the fabrication of MEMS devices, the processes used in MEMS are generally larger in footprint, thickness, and pitch. This lower resolution requirement means that older equipment may be utilized in MEMS manufacturing. This equipment is generally operated much harder per cycle, however, than is required for IC fabrication in order to achieve the thicker, larger films and features. As a result, a preferred fabrication facility may be one that is outmoded for modern IC fabrication, and thus the equipment value may be less and the loss from equipment degradation correspondingly less related to the equipment's value. Thus the cost of producing device 5 may be further reduced relative to alternative technologies for beam steering.

Figure 2:
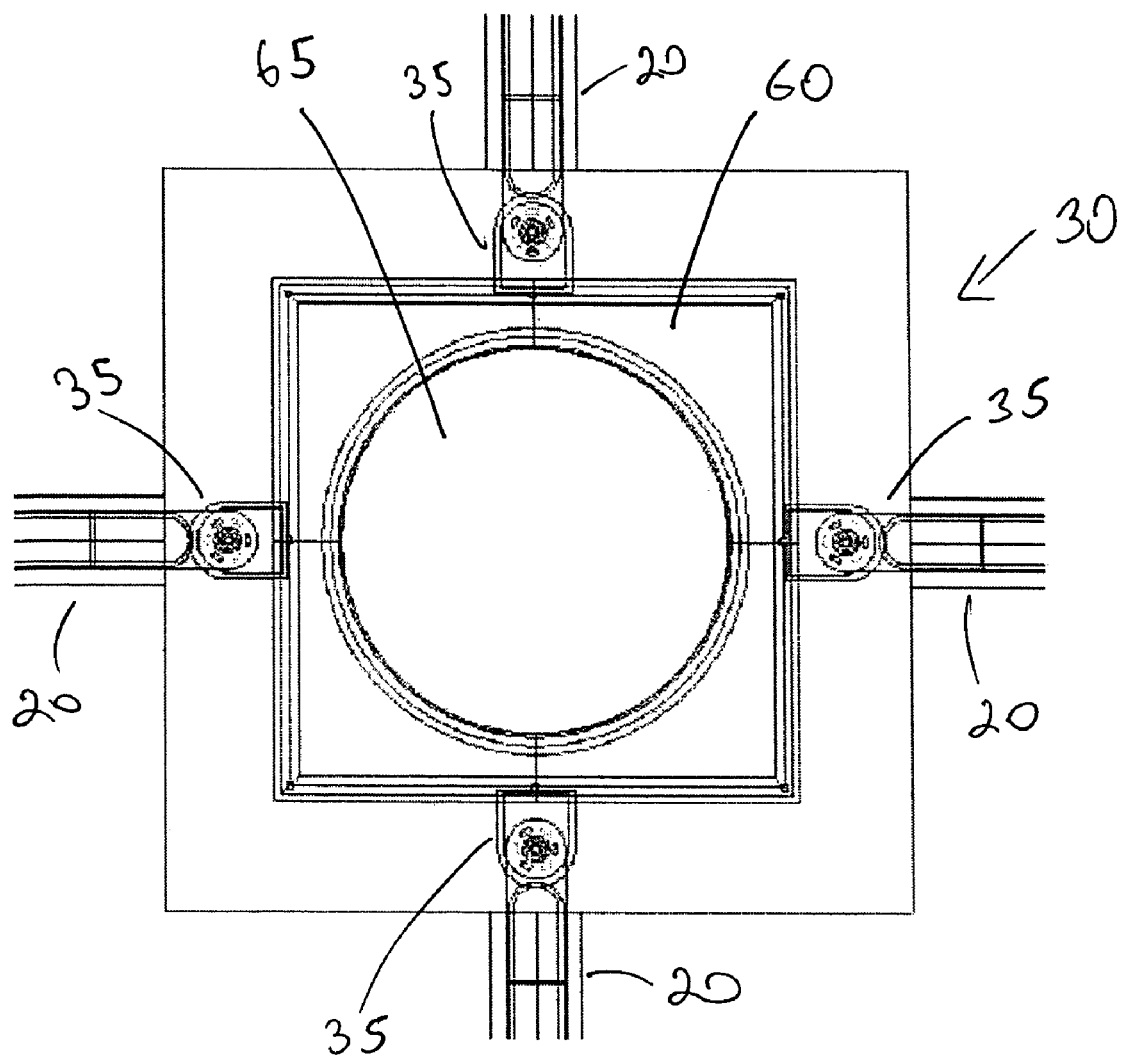
FIG. 2 is a detail schematic diagram showing the fiber yoke portion of the layout of a MEMS-based device according to a preferred embodiment of the present invention.

Referring now to FIG. 2, fiber yoke 25 and a portion of arms 20 according to a preferred embodiment may be described in greater detail. Yoke frame 60 is preferably of a roughly square shape and, like the other MEMS elements of device 5, is fabricated from subsequent deposition of polysilicon films. Yoke hole 65 is sized to receive an optical fiber (not shown in FIG. 2 for clarity). The standard optical fiber outside diameter of 125 microns is employed in the preferred embodiment, such that the size of yoke hole 65 in the preferred embodiment is preferably about 130 microns to snugly receive the 125 micron fiber. Arms 20 attach to yoke frame 60 at pivot joints 35. These joints allow arms 20 to pivot in the X-Y plane with respect to yoke frame 60, thereby allowing yoke frame 60 to move freely within the X-Y plane within a defined area passing over substrate 30.

Figure 3:
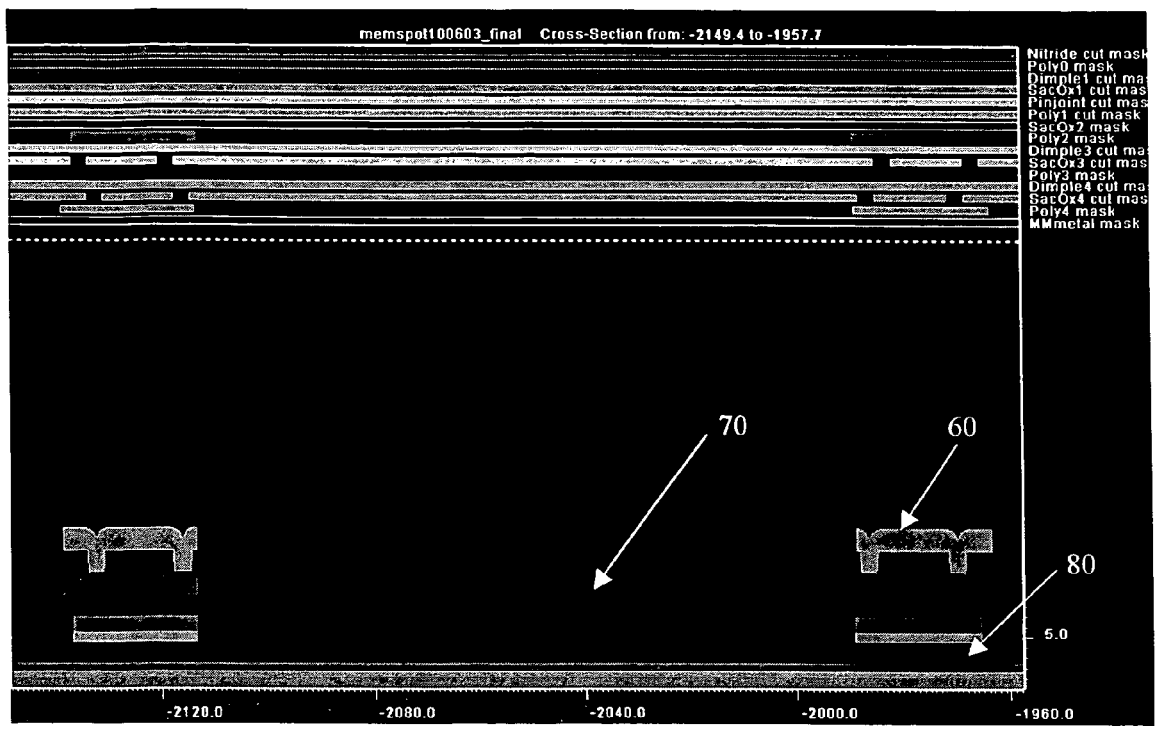
FIG. 3 is a cross-sectional view showing the fiber yoke portion of the layout of a MEMS-based device according to a preferred embodiment of the present invention.

Referring now to FIG. 3, fiber yoke 25 and its related components may be seen in profile, showing the manner in which the polysilicon film layers are built up during the fabrication of device 5. Yoke hole 65 is shown in the center portion of FIG. 3, with the layered elements on either side being yoke frame 60. The gaps in the polysilicon layers of yoke frame 60 are filled with silicon dioxide in the preferred embodiment. Each layer of yoke frame 60 is preferably about two microns thick. A two-micron clearance 80 is preferably formed between the lower surface of yoke frame 60 and the upper surface of substrate 30. This clearance allows fiber yoke 25 to glide over substrate 30 as it translates the optical fiber in the focal plane of the transmitter or receiver. As explained above, yoke 25 is drive by actuators 15, which respond to signals that are sequenced and applied to the various actuators 15 to create the desired motion through the associated arms 20.

Figure 4:
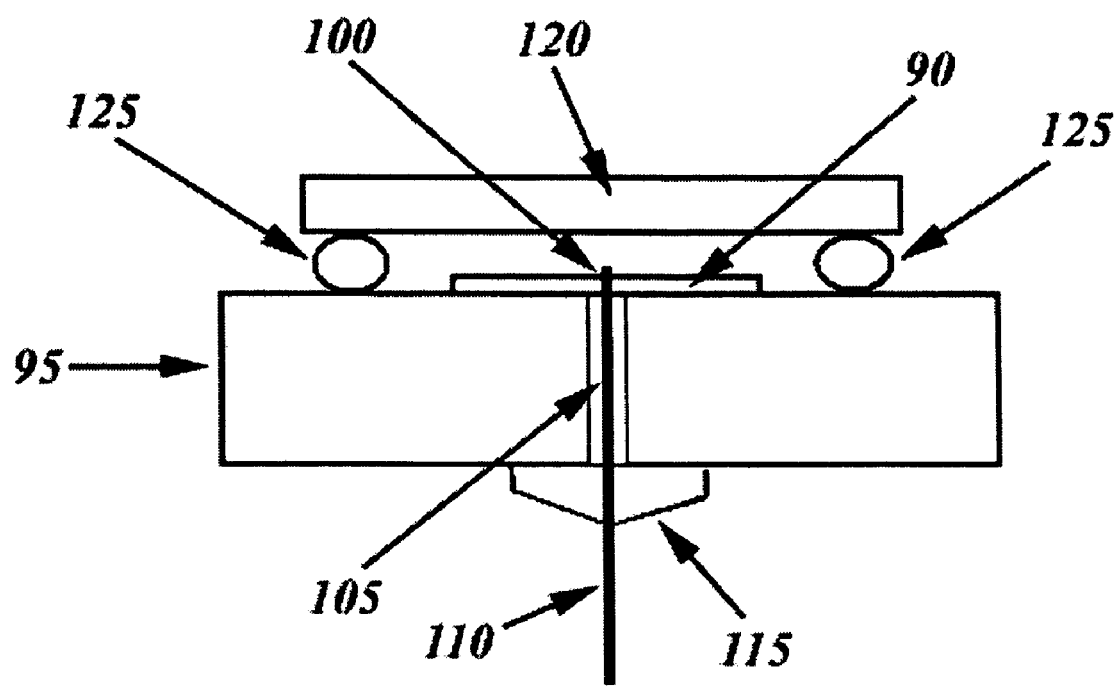
FIG. 4 is a cross-sectional view of a MEMS-based device package including the epoxy staking and optical fiber according to a preferred embodiment of the present invention.

Turning now to FIG. 4, the system package assembly for device 5 is shown in profile. Device 5 has a substrate passage 100 formed at its center in order to allow the passage and deflection of optical fiber 110. In the preferred embodiment, substrate passage 100 has a diameter of approximately 250 microns. Substrate passage 100 is preferably formed by a standard chemical etching technique to a silicon oxide layer that serves as an etch stop. Device 5 is preferably held in place by epoxy or other permanent means on the package or printed circuit board (PCB) 95. Substrate passage 100 in device 5 must be properly aligned with PCB passage 105 during attachment. Fiber 110 is fed through PCB passage 105, substrate passage 100, and into yoke 25 (not shown for clarity in FIG. 4). Fiber 110 may preferably be staked into place by means of epoxy or other permanent adhesive 115 at the bottom surface of PCB 95. The components are sealed and protected by the application of a lid 120, which may be formed of glass or another sufficiently strong and transparent material. Lid 120 is sealed into place with sealing ring material 125, which may in the preferred embodiment be an epoxy. The resulting assembly may then be mounted into the optical transmitter or receiver, with the fiber pigtail connected to a laser communications signal processor. It may be noted that while the preferred embodiment has been described for use with respect to a dedicated transmitter or receiver, the preferred embodiment may also be employed in a transceiver arrangement, where the same optical fiber is used to both send and receive optical signals.

The present invention has been described with reference to certain preferred and alternative embodiments that are intended to be exemplary only and not limiting to the full scope of the present invention as set forth in the appended claims.

What is claimed is:

1. An optical beam-steering apparatus, comprising:
   (a) an optical fiber; and
   (b) a MEMS device in communication with said optical fiber, wherein said MEMS device comprises a plurality of actuators pivotally linked to said optical fiber and wherein said actuators comprise electrostatic comb-drive actuators operable to displace said optical fiber laterally with respect to said MEMS device.

2. The apparatus of claim 1, further comprising a plurality of arms, each of said arms connecting one of said actuators to said optical fiber.

3. The apparatus of claim 2, wherein each of said arms is pivotally linked to one of said actuators.

4. The apparatus of claim 3, wherein each of said arms is pivotally linked to said optical fiber.

5. The apparatus of claim 2, further comprising a fiber yoke circumscribing said fiber and pivotally connected with said arms.

6. The apparatus of claim 1, further comprising a plurality of signal inputs in communication with said actuators wherein said actuators extend or retract in response to a signal at said signal inputs.

7. The apparatus of claim 6, wherein said actuators comprise a plurality of actuators arranged in series.

8. The apparatus of claim 7, wherein said actuators further comprise at least one actuator arranged perpendicularly to said plurality of actuators arranged in series.

9. An optical beam-steering apparatus, comprising:
   (a) an optical fiber; and
   (b) a MEMS device in communication with said optical fiber, wherein said MEMS device comprises a plurality of actuators arranged in series and pivotally linked to said optical fiber and operable to displace said optical fiber laterally with respect to said MEMS device.

10. The apparatus of claim 9, further comprising a plurality of arms, each of said arms connecting one of said actuators to said optical fiber.

11. The apparatus of claim 10, wherein each of said arms is pivotally linked to one of said actuators.

12. The apparatus of claim 11, wherein each of said arms is pivotally linked to said optical fiber.

13. The apparatus of claim 10, further comprising a fiber yoke circumscribing said fiber and pivotally connected with said arms.

14. The apparatus of claim 10, wherein said actuators comprise electrostatic comb-drive actuators.

15. The apparatus of claim 9, further comprising a plurality of signal inputs in communication with said actuators wherein said actuators extend or retract in response to a signal at said signal inputs.

16. The apparatus of claim 9, further comprising at least one actuator arranged perpendicularly to said plurality of actuators arranged in series.

17. An optical beam-steering apparatus, comprising:
   (a) a laterally disposed substrate comprising an opening;
   (b) an optical fiber passing through said substrate opening; and
   (c) a comb-drive actuator comprising a first and second electrode array, wherein said first electrode array is operable to move laterally along said substrate with respect to said second electrode array in response to an electrostatic potential difference applied between said first and second electrode arrays, and wherein said first electrode array is linked to said optical fiber whereby said optical fiber moves laterally in response to a lateral movement of said first electrode array.

18. The apparatus of claim 17, further comprising an arm connecting said first electrode array to said optical fiber.

19. The apparatus of claim 18, wherein said arm is pivotally linked to said first electrode array.

20. The apparatus of claim 19, wherein said arm is pivotally linked to said optical fiber.

* * * * *

UNITED STATES PATENT AND TRADEMARK OFFICE
CERTIFICATE OF CORRECTION

PATENT NO.         : 7,224,508 B2
APPLICATION NO.    : 11/224473
DATED              : May 29, 2007
INVENTOR(S)        : Chuck H. Chalfant, III et al.

It is certified that error appears in the above-identified patent and that said Letters Patent is hereby corrected as shown below:

Specification

In Column 1, lines 21-26, delete "The U.S. Government has a paid-up Iciense in this invention and the right in limited circumstances to require the patent owner to license others on reasonable terms as provided for by the terms of contract no. F29601-02-C-0021 awarded to the United States Air Force Research Laboratory." and insert --This invention was made with Government support under contract F29601-02-C-0021 and FA9453-12-M-0354 awarded by the United States Air Force. The Government has certain rights in this invention.--, therefor.

Signed and Sealed this
Twenty-seventh Day of October, 2015

Michelle K. Lee
*Director of the United States Patent and Trademark Office*